US010455056B2

(12) United States Patent
Smith et al.

(10) Patent No.: US 10,455,056 B2
(45) Date of Patent: Oct. 22, 2019

(54) CLOUD-BASED STORAGE AND INTERCHANGE MECHANISM FOR DESIGN ELEMENTS

(71) Applicant: ADOBE INC., San Jose, CA (US)

(72) Inventors: Michael Smith, San Francisco, CA (US); Sedat Akkus, San Francisco, CA (US); Nayoung Kim, San Francisco, CA (US); Lavanya Raghunath, San Jose, CA (US); Cynthia Kaschub, San Francisco, CA (US); Srinivas Annam, San Jose, CA (US); Mark Shepherd, Tiburon, CA (US); Jacob Surber, Redwood City, CA (US); Glenn Ruehle, Novato, CA (US); Glade Miller, Cedar Hills, UT (US); George Comninos, San Francisco, CA (US); Gavin Peacock, Walnut Creek, CA (US)

(73) Assignee: Abobe Inc., San Jose, CA (US)

( * ) Notice: Subject to any disclaimer, the term of this patent is extended or adjusted under 35 U.S.C. 154(b) by 234 days.

(21) Appl. No.: 14/833,006

(22) Filed: Aug. 21, 2015

(65) Prior Publication Data

US 2017/0054831 A1    Feb. 23, 2017

(51) Int. Cl.
*H04L 29/08* (2006.01)
*H04L 29/12* (2006.01)

(52) U.S. Cl.
CPC .......... *H04L 67/34* (2013.01); *H04L 67/1095* (2013.01); *H04L 67/1097* (2013.01); *H04L 61/1552* (2013.01)

(58) Field of Classification Search
CPC ... H04L 67/1097; H04L 67/34; H04L 67/306; H04L 67/12; H04L 67/1095; H04L 61/1552
See application file for complete search history.

(56) References Cited

U.S. PATENT DOCUMENTS 5,999,190 A * 12/1999 Sheasby .................. G06T 11/00
345/589
6,504,554 B1 * 1/2003 Stone ................ G06F 17/30893
707/E17.117

(Continued)

OTHER PUBLICATIONS

Johnson, S. (2013). Working with Styles In. Adobe® InDesign® CC onDemand (42 pages). Indianapolis, IN: Que Publishing.

(Continued)

*Primary Examiner* — Patrice L Winder
(74) *Attorney, Agent, or Firm* — Shook, Hardy & Bacon LLP

(57) ABSTRACT

Techniques for sharing design elements between different applications and/or devices are provided. A design element is received from a first application as multiple representations, each of the multiple representations corresponding to a complementary storage format for the design element based on a design element type. The design element is stored as the multiple representations in a centrally stored library, the centrally stored library being shared among a plurality of applications. An indication to use the design element in a second application may be received. At least one of the multiple representations may be returned, as determined by the second application.

20 Claims, 5 Drawing Sheets

(56) References Cited

U.S. PATENT DOCUMENTS

| | | | | |
|---|---|---|---|---|
| 7,213,035 | B2* | 5/2007 | Ornstein | G06F 17/30905 |
| 7,386,789 | B2* | 6/2008 | Chao | G06F 17/24 |
| | | | | 707/999.003 |
| 7,447,713 | B1* | 11/2008 | Berkheimer | G06F 9/4488 |
| 7,636,792 | B1* | 12/2009 | Ho | H04L 67/2823 |
| | | | | 709/200 |
| 7,921,370 | B1 | 4/2011 | Legault | |
| 8,037,015 | B2* | 10/2011 | Kent | G06T 11/60 |
| | | | | 345/418 |
| 8,484,553 | B2* | 7/2013 | Lloyd | G06F 17/211 |
| | | | | 715/205 |
| 8,510,100 | B2* | 8/2013 | Glass | G06F 3/0482 |
| | | | | 434/98 |
| 8,769,405 | B2* | 7/2014 | Bacus | G06F 17/214 |
| | | | | 715/234 |
| 9,282,168 | B2* | 3/2016 | Prahlad | H04L 67/42 |
| 9,332,233 | B2* | 5/2016 | Yanagidate | H04N 1/33307 |
| 9,411,790 | B2* | 8/2016 | McKinney | G06F 17/2247 |
| 9,471,556 | B2* | 10/2016 | Little | G06F 17/24 |
| 9,569,865 | B2* | 2/2017 | Kaasila | G06F 17/214 |
| 9,626,080 | B1* | 4/2017 | Labaj | G06F 3/00 |
| 9,632,851 | B1* | 4/2017 | Johansson | G06F 9/543 |
| 2002/0109729 | A1* | 8/2002 | Dutta | G06Q 30/02 |
| | | | | 715/790 |
| 2005/0132284 | A1* | 6/2005 | Lloyd | G06F 17/211 |
| | | | | 715/236 |
| 2006/0047718 | A1* | 3/2006 | Keith | G06F 12/0831 |
| 2006/0288015 | A1* | 12/2006 | Schirripa | G06F 17/30905 |
| 2007/0061351 | A1* | 3/2007 | Villaron | G06F 17/218 |
| 2007/0061743 | A1* | 3/2007 | Golbandi | G06F 3/04817 |
| | | | | 715/763 |
| 2007/0176934 | A1* | 8/2007 | Toivola | G06F 17/24 |
| | | | | 345/467 |
| 2007/0239833 | A1* | 10/2007 | Alperin | H04L 51/36 |
| | | | | 709/206 |
| 2007/0294366 | A1* | 12/2007 | Ozzie | G06F 17/30578 |
| | | | | 709/217 |
| 2008/0005150 | A1* | 1/2008 | Gupta | G06F 17/30067 |
| 2008/0052704 | A1 | 2/2008 | Wysocki | |
| 2008/0263070 | A1* | 10/2008 | Villaron | G06T 11/00 |
| 2010/0070594 | A1* | 3/2010 | Yoshimura | H04L 51/066 |
| | | | | 709/206 |
| 2010/0208104 | A1* | 8/2010 | Imagawa | H04N 5/2176 |
| | | | | 348/234 |
| 2010/0231598 | A1* | 9/2010 | Hernandez | G06F 17/214 |
| | | | | 345/471 |
| 2010/0318898 | A1* | 12/2010 | Rees | G06F 17/30905 |
| | | | | 715/236 |
| 2010/0325086 | A1* | 12/2010 | Skinner | G06F 17/30905 |
| | | | | 707/609 |
| 2011/0093565 | A1* | 4/2011 | Bacus | G06F 17/30905 |
| | | | | 709/219 |
| 2012/0066601 | A1* | 3/2012 | Zazula | H04N 21/854 |
| | | | | 715/733 |
| 2012/0192046 | A1* | 7/2012 | Slatter | G06F 17/211 |
| | | | | 715/202 |
| 2013/0117319 | A1* | 5/2013 | Soltani | G06F 17/30569 |
| | | | | 707/792 |
| 2013/0184845 | A1* | 7/2013 | Hales | G05B 19/41865 |
| | | | | 700/97 |
| 2013/0185339 | A1* | 7/2013 | Clay | G06F 17/2205 |
| | | | | 707/821 |
| 2013/0282720 | A1* | 10/2013 | Baker | G06F 17/30705 |
| | | | | 707/737 |
| 2014/0164315 | A1* | 6/2014 | Golshan | G06F 17/30011 |
| | | | | 707/608 |
| 2014/0282398 | A1* | 9/2014 | Podolyak | G06F 8/36 |
| | | | | 717/121 |
| 2014/0337321 | A1* | 11/2014 | Coyote | G06F 17/30873 |
| | | | | 707/722 |
| 2015/0143210 | A1* | 5/2015 | Lam | G06F 17/30056 |
| | | | | 715/202 |
| 2015/0180938 | A1* | 6/2015 | Ruppin | G06F 21/10 |
| | | | | 726/30 |
| 2015/0193387 | A1 | 7/2015 | Ho et al. | |
| 2015/0249848 | A1* | 9/2015 | Holman | H04N 21/23439 |
| | | | | 348/469 |
| 2015/0332493 | A1* | 11/2015 | Adamson, III | G06T 11/60 |
| | | | | 345/471 |
| 2015/0339268 | A1* | 11/2015 | Bednarz, Jr. | G06F 17/30896 |
| | | | | 715/248 |
| 2016/0098250 | A1* | 4/2016 | Gross | G06F 8/38 |
| | | | | 717/109 |
| 2016/0132301 | A1* | 5/2016 | Riscutia | G06F 8/38 |
| | | | | 715/763 |
| 2016/0283475 | A1* | 9/2016 | Panchapakesan | |
| | | | | G06F 17/30094 |
| 2017/0052653 | A1 | 2/2017 | Smith et al. | |
| 2017/0090734 | A1* | 3/2017 | Fitzpatrick | G06F 17/2247 |

OTHER PUBLICATIONS

First Action Interview Office Action dated Jun. 25, 2018 in U.S. Appl. No. 14/833,002, 7 pages.
Final Office Action dated May 10, 2019 in U.S. Appl. No. 14/833,002, 12 pages.

* cited by examiner

CLOUD-BASED STORAGE AND INTERCHANGE MECHANISM FOR DESIGN ELEMENTS

BACKGROUND

Different applications may be used as part of a user's regular workflow since each application provides different functionality to the user. Thus, when producing content, the user may use multiple applications during the production of the content. A user may also use multiple devices during the production of content. In such cases, a user may wish to share data and/or information, e.g., style information, among the different applications and devices.

Various solutions have been provided to share data and information among applications and devices. For example, an application may include a reader to support non-native types of data. However, the user may need to save the data in a format that the reader can understand, requiring multiple copies of the data supported by the different applications. Furthermore, it may be difficult to extract the data in a format that is usable by another application or device. For example, color scheme information may not be easily transferrable between applications since it may be embedded as part of a larger custom data format (e.g. colors stored in a PSD (Photoshop document) file).

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are concerned with storing and interchanging design elements between multiple applications and/or devices. This provides a user with the ability to reuse design elements without requiring the user to create multiple versions of design elements that are compatible with the multiple applications and devices. In some embodiments described herein, a design element is received from a first application as multiple representations of the design element, each of the representations corresponding to a complementary storage format. The multiple representations are stored in a centrally stored library provided by a library storage service. When a user attempts to use the design element in a second application, at least one of the representations is determined to be compatible with the second application and the representation is returned for use by the second application.

BRIEF DESCRIPTION OF THE DRAWINGS

The present invention is described in detail below with reference to the attached drawing figures, wherein.

DETAILED DESCRIPTION

Figure 1:
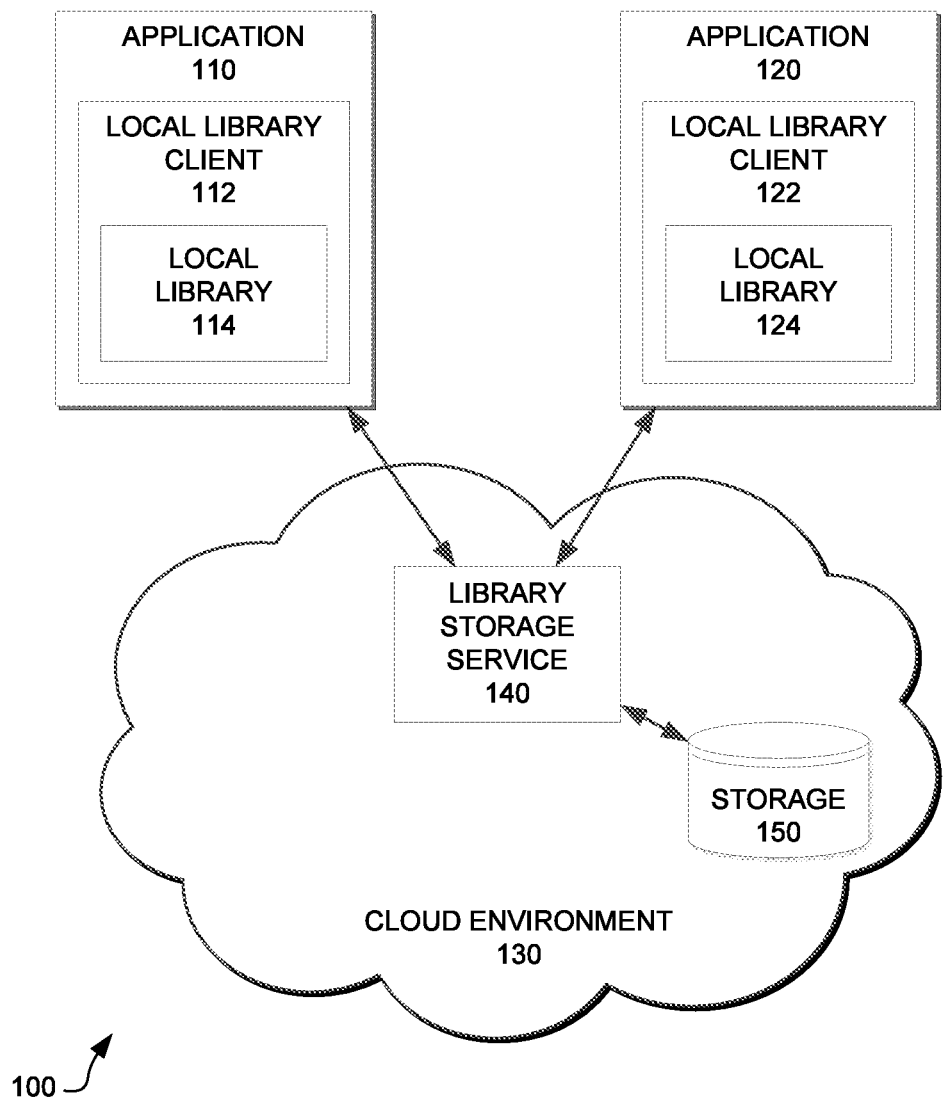
FIG. 1 is a block diagram illustrating an exemplary system for storage and interchange of design elements in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b) unless otherwise indicated to the contrary.

A "design element" is defined herein as an element of a document that defines a property or component embedded in the document. For example, a property can be a color, color theme, font, text style, layout, special effect, brush, or layer style that is used as part of the design of the document. A component can be a graphic or text embedded in the document. A component can also be a file that can be incorporated into a document. A design element can be displayed in a library as a single library item with references to multiple stored representations.

A "representation" is defined herein as the storage components of a design element. For example, if a design element is a color, the representations can be RGB, CMY(K), HSL, YUV, YCbCr, and YPbPr representations of the color. As another example, if the design element is a vector image file, the representations can be AI and SVG files. The representations can be located in a single document or in separate documents.

A "library" is defined herein as a compilation of design elements. A "centrally stored library" is defined herein as a library that is stored in a "library storage service," which may be provided by a server, for instance, in a cloud computing environment. A centrally stored library is not specific to an application and may include design elements from multiple applications. The library storage service maintains the centrally stored library, which stores the design elements and representations that are available for the applications and devices. The library storage service also provides interfaces to local library clients to synchronize the contents of local libraries with the centrally stored library. A "local library" is defined herein as a library that is specific to an application on a device. A local library client (also referred to as a "library client") refers to the interface in an application for accessing the local library specific to the application. Multiple local libraries may exist on a device, where each local library is specific to an application on the device and is accessed via a library client.

A "complementary storage format" is defined herein as a storage format that can represent the same or similar data of another storage format. Thus, for some applications, a file of a complementary storage format can be substituted for the original file. For example, complementary storage formats for a GIF (Graphics Interchange Format) file (a type of image file) can include BMP (Windows bitmap), JPEG (Joint Photographic Experts Group), and PNG (Portable Network Graphics) files, among others.

Applications use design elements as a way to produce documents faster and to ensure consistency between documents. However, sharing these design elements presents a challenge when these design elements come from another application or device. A user may want to share design elements among different applications and devices. When the design element is a style or other information embedded in a file, it may be difficult to isolate this data in a form that can be transferred and used by another application or device. Furthermore, it may be difficult or impossible to share this design element if the other application or device cannot understand or use the original format of the design element.

Embodiments of the present invention are directed to storing and interchanging design elements between multiple applications and/or devices. This provides a user with the ability to reuse design elements without requiring the user to create multiple versions of design elements that are compatible with the multiple application and devices. In some embodiments described herein, a design element is received from a first application and stored in a centrally stored library as multiple representations of the design element. For example, the first application determines complementary storage formats for the design element and sends multiple representations of the design element to the centrally stored library, each of the representations corresponding to a complementary storage format. A library storage service stores the multiple representations of the design element in the centrally stored library. When a user selects the design element for use in a second application, at least one of the representations is determined to be compatible with the second application and returned for use by the second application.

By storing a design element using multiple representations, a user may easily share design elements among applications and devices without sacrificing fidelity or having to individually create multiple copies of the design element usable by the applications and devices. The user need not worry about how design elements are saved and can just use the design element easily and securely across applications and devices. Furthermore, design elements can be shared among different users, allowing different users to use and make changes to the design elements, creating a collaborative environment for the sharing of design elements.

FIG. 1 is a block diagram illustrating an exemplary system for storage and interchange of design elements in accordance with implementations of the present disclosure. A system for storage and interchange of design elements 100 includes applications 110, 120 and a cloud environment 130. Although a cloud environment 130 is described, it should be understood that the system 100 may also be located on a single user device or multiple user devices. It should also be understood that applications 110, 120 may also be part of the cloud environment 130, e.g., web-based applications, and are shown as being separate from the cloud environment 130 for illustrative purposes only. The applications 110, 120 may exist on a user device or may be retrieved, e.g., downloaded, to a user device from the cloud environment 130. Applications 110, 120 may be on the same user device or different user devices.

Applications 110, 120 include local libraries clients 112, 122, respectively. Local library clients 112, 122 may be incorporated as part of applications 110, 120, or may be retrieved from the cloud environment 130 upon, e.g., using applications 110, 120. Local library clients 112, 122 may each store local libraries 114, 124, respectively, which contains representations of design elements, on the user device. Alternatively, local library clients 112, 122 may retrieve at least one representation of a design element from the cloud environment 130 when the design element is selected. Local library clients 112, 122 may display the design element as a single design element while storing multiple representations of the design element. A user need not know how the representations are being stored, and can just be aware that a design element is usable in applications 110, 120.

Local library clients 112, 122 may display design elements of different types. For example, design element types being displayed in local library clients 112, 122 may include images and color information. Thus, local library clients 112, 122 can display both design element types, even if the method of storing the multiple representations differs. In some embodiments, the multiple representations may include a primary representation and one or more complementary representations. For example, the primary representation may be the originally received representation of the design element. Alternatively, the primary representation may be a representation with the highest fidelity, e.g., the representation with the most detail. The complementary representations may be representations that are compatible with the design element type. For example, a color may be represented by RGB, CMY(K), HSL, YUV, YCbCr, and YPbPr design element representations.

Local library clients 112, 122 are connected, e.g., via a network, to a library storage service 140. Although the library storage service 140 is located in the cloud environment 130 in FIG. 1, a library storage service may be located in other locations in other configurations. For instance, the library storage service 140 may be located on the same user device as applications 110, 120 and may be connected to applications 110, 120 via communication channels of the user device. The library storage service 140 stores a centrally stored library that includes the design elements available to applications 110, 120. The centrally stored library is not limited to those design elements available to applications 110, 120, and may include any design element available to any application. Alternatively, the centrally stored library may include any design element available to a particular user. Thus, the centrally stored library may include design elements not found in local libraries 114, 124.

The library storage service 140 is connected to storage 150. The storage 150 may also be located on the cloud environment 130 or on a user device. The storage 150 can store a portion of the representations of the centrally stored library. For example, the multiple representations of a design element may be stored as files. The storage 150 may store the files, and the library storage service 140 may point to files on the storage 150. Thus, when a design element is selected from the library storage service 140 (or local library clients 112, 122), the file may be accessed from the storage 150. It should be understood, that each of the local library clients 112, 122 may have a local storage, where the local storage is retrieved from the storage 150. For example, the local storage may contain representations of design elements available to applications 110, 120, respectively.

Having described various aspects of the system for storage and interchange of design elements 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. It should be understood that this and other arrangements described herein are set forth only as examples. Other arrangements and elements (e.g., machines, interfaces, functions, orders, and grouping of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 2A:
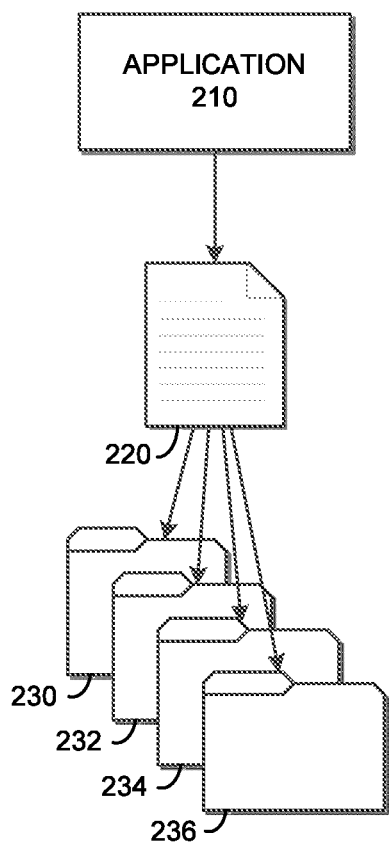
FIG. 2a is a diagram illustrating storing a design element in accordance with implementations of the present disclosure.
Figure 2B:
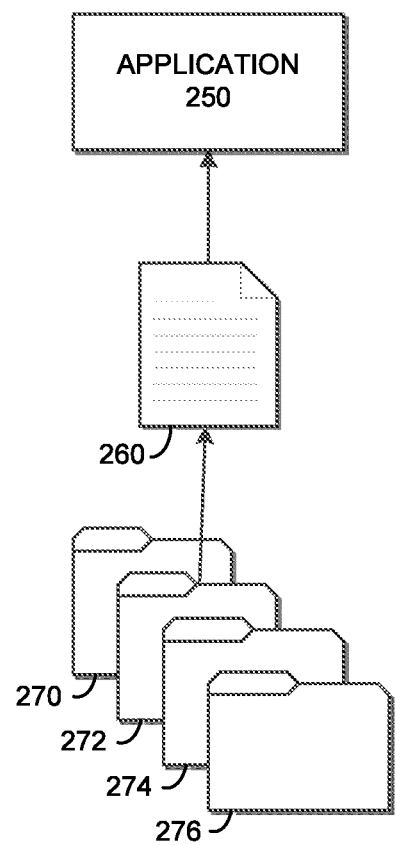
FIG. 2b is a diagram illustrating retrieving a design element in accordance with implementations of the present disclosure.

FIGS. 2a and 2b are diagrams illustrating storing and retrieving a design element, respectively, in accordance with implementations of the present disclosure. Referring to FIG. 2a, a user using application 210 may attempt to store a design element 220 in the local library of application 210. As the design element 220 is being stored, multiple representations 230, 232, 234, 236 can be created. The multiple representations 230, 232, 234, 236 can be generated by the application 210 and sent to a centrally stored library. Alternatively, the library storage service can generate the multiple representations. Based on the design element type of the design element 220, the format of the multiple representations 230, 232, 234, 236 can be determined. For example, if the design element 220 is a color, the design element can be stored as RGB, CMY(K), HSL, YUV, YCbCr, and YPbPr color representations. It should be understood that the list is illustrative and that a color is not limited to those representations. As another example, a vector image file may be stored as an AI representation and a SVG representation, among others. Alternatively, the design element can be stored as a single representation, where the multiple representations are generated when the design element is used, e.g., by a second application. For example, if the design element 220 is a color, the design element can be stored as a RGB representation. If a second application uses the HSL design element type, an HSL representation can be generated and stored in the local library client of the application (which will be described further below).

Now referring to FIG. 2b, a user using application 250 may attempt to retrieve a design element 260 from the local library of application 250. The design element 260 may be stored as multiple representations 270, 272, 274, 276. Based on the application 250, at least one of the multiple representations 270, 272, 274, 276 is retrieved for use in the application 250 (e.g., as shown in FIG. 2b, representation 272 is retrieved). For example, if the design element is a color, at least one of the RGB, CMY(K), HSL, YUV, YCbCr, and YPbPr color representations is retrieved. The representation retrieved may be the representation that is compatible with the application 150 and is of the highest fidelity that is usable by the application. Using a vector image file as an example, if the application 250 is not compatible with the AI representation but is compatible with the SVG representation, the SVG representation may be retrieved. In some embodiments, both representations are retrieved, where the combination of information stored for each of the representations may be used to reproduce the design element.

In some embodiments, the design element may be stored as a single representation. For example, if the original design element is a SVG representation, the library storage service may store the design element in the centrally stored library as a SVG representation. If an application wanting to use the design element cannot understand the SVG format, the server can generate a representation that is understandable by the application. For example, if an application cannot understand a SVG representation, but understands a PNG (Portable Network Graphics) representation, the library storage service may generate a PNG representation of the design element, which can be downloaded and cached in a local library usable by the application. In some embodiments, the library storage service may determine the highest fidelity format understandable by the application, and generate a representation of the design element of the highest fidelity format.

In some embodiments, an application on the user device may generate a representation that is understandable by the application. For example, a color may be stored in the centrally stored library as a single representation, e.g., HSL. If the application uses a different format, e.g., RGB, the application can take the HSL representation and generate a RGB representation from the HSL representation. The generating a new representation is hidden from the user, since only the color design element is displayed in the local library client. In some embodiments, for design elements that may not be easily translated (i.e., a new representation is generated from a previously stored representation), multiple representations can be stored for that design element.

Figure 3:
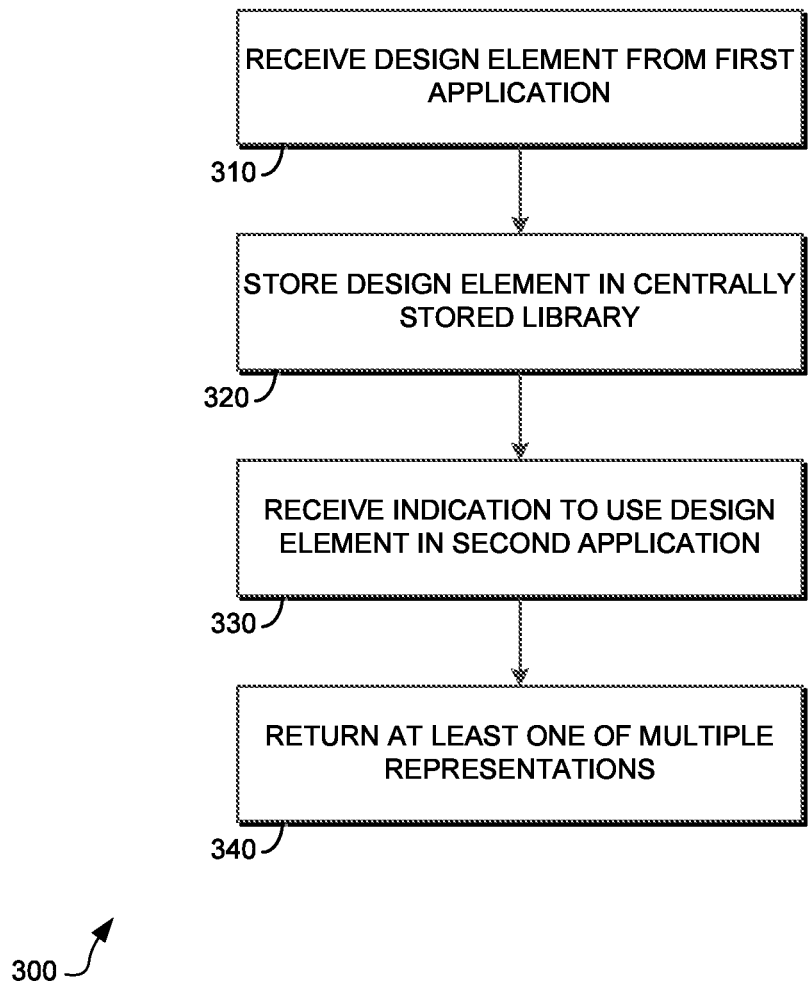
FIG. 3 is a flow diagram illustrating a method for storage and interchange of design elements in accordance with implementations of the present disclosure.

Turning now to FIG. 3, a method 300 for storage and interchange of design elements is shown, in accordance with implementations of the present disclosure. Method 300 may be performed on one or more servers in a data center or across multiple data centers.

At block 310, a design element is received from a first application. For example, a user may insert a design element into a local library client of the first application. The local library client sends the design element to a library storage service. Alternatively, the local library of the local library client and the centrally stored library of the library storage service may be synchronized periodically or upon request, where new design elements may be received by the centrally stored library. The centrally stored library may be located, e.g., on a cloud computing platform. The centrally stored library may be shared among different applications on a user device and applications on different user devices. The design element may be displayed in the local library (via the library client) of the first application.

At block 320, the design element is stored in the centrally stored library. The first application may determine complementary storage formats for the design element based on the design element type and sends the design elements as multiple representations of the design element type to the library storage service. The library storage service stores the multiple representations in the centrally stored library. Each of the multiple representations may correspond to one of the complementary storage formats. For example, a color may have RGB, CMY(K), HSL, YUV, YCbCr, and YPbPr as complementary storage formats. Thus, a color may be stored as RGB, CMY(K), HSL, YUV, YCbCr, and YPbPr representations. As another example, the design element can be a style; and may store style information corresponding to the design element type. Thus, based on the design element type, the format for the multiple representations may be determined. The design element can also be a file; and the complementary storage formats may be determined based on mime types, file extensions, and/or file formats of the design element. The library storage service may store each of the representations in a single file or as multiple files. For example, for a design element that can be represented easily, it may be more efficient to represent the multiple representations in a single file instead of separate files. However the multiple representations are stored, in a single file or as multiple files, the library storage service (via a local library client) can characterize them as a single design element.

At block 330, an indication to use the design element in a second application is received. For example, a user may select the design element from the local library client of a second application. Alternatively, the centrally stored library and local library of the second application may be synchronized.

At block 340, at least one of the multiple representations of the design element is returned. The representation that is returned may be determined by the second application. For example, a local library client of the second application may receive a new design element. The design element received by the second application is compatible with the second application, i.e., the second application understands the format of the design element. Thus, for the representation being returned, the format type is determined by the application. For example, the multiple representations corresponding to the design element may be retrieved and the interoperability of each of the multiple representations with the second application may be determined. Thus, the returned representation is determined based on the interoperability of each of the multiple representations with the second application.

In some embodiments, an application may not be compatible with any of the design element representations. In that instance, the local library client need not display the design element. For example, a third application may not be compatible with the design element type. In that case, the design element may be prevented from being displayed in the local library client of the third application. Alternately, the design element can be greyed out so that the user can know that a design element is stored in the local library (but unavailable in the local library client of the application). The user may also configure whether the design element is displayed in the local library client. In some embodiments, multiple representations of the design element can be displayable in the local library client. For example, an application may be compatible with multiple design element formats. Thus, the user may select one of the multiple representations, where the selected one of the multiple representations is returned. For example, the design element may be displayed in the local library client. Once the design element is selected, the multiple representations may be displayed. The user can then select one of the multiple representations for use in the application. The multiple representations may be displayed in the local library client in a ranked order. For example, the multiple representations may be displayed in the local library client based on the level of detail. It should be understood that the level of detail is one manner of ordering the multiple representations, and that other orderings may be envisioned. For example, the multiple representations may be ordered by size.

In some embodiments, the design element may be changed. For example, an indication to change the design element may be received from the first application. For example, the user may make a change to an image. Thus, the multiple representations of the design element of the original design element stored in the centrally stored library may be replaced with new multiple representations corresponding to the changed design element. Alternatively, a new design element may be stored in the centrally stored library corresponding to the changed design element.

Figure 4:
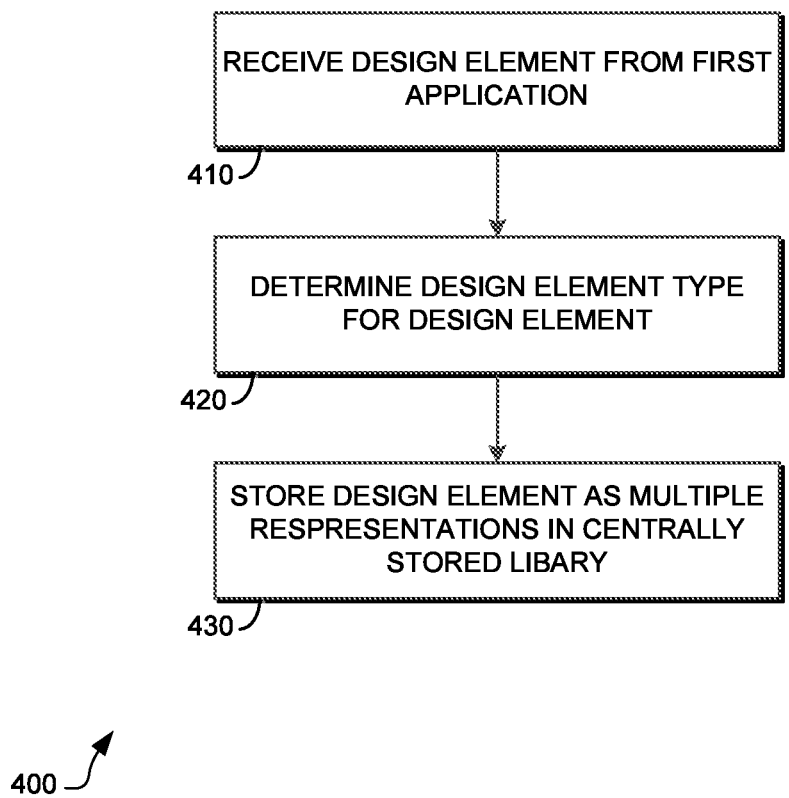
FIG. 4 is a flow diagram illustrating another method for storage and interchange of design elements in accordance with implementations of the present disclosure.

Turning now to FIG. 4, another method 400 for the storage and interchange of design elements is shown, in accordance with implementations of the present disclosure. Method 400 may be performed on one or more servers in a data center or across multiple data centers.

At block 410, a design element is received from a first application. For example, a user may insert a design element into a local library of the first application. The local library client then sends the design element to a library storage service. Alternatively, the local library and the centrally stored library may be synchronized periodically or upon request, where new design elements may be received by the centrally stored library. The library storage service may be located, e.g., on a cloud computing platform. The centrally stored library may be shared among different applications on a user device and applications on different user devices. The design element may be displayed in the local library of the first application.

At block 420, a design element type is determined for the design element. For example, the design element type may be determined based on the mime type, file extension, and/or file format of the design element. In some embodiments, the design element may be tagged or may contain metadata about the design element type.

At block 430, the design element is stored as multiple representations in a centrally stored library, the multiple representations corresponding to one or more variations of the design element type. For example, the first application may determine variations of the design element based on the design element type and send the design elements to the centrally stored library as multiple representations of the design element type. Each of the multiple representations may correspond to one of the variations of the design element. For example, a color may have RGB, CMY(K), HSL, YUV, YCbCr, and YPbPr as variations of a color design element. Thus, a color may be stored as RGB, CMY(K), HSL, YUV, YCbCr, and YPbPr representations. The multiple representations may be stored in a, e.g., manifest file. The manifest file may have tags or labels identifying the design element and the multiple representations of the design element. For example, if the design element is a style, the contents of one or more of the multiple representations may be stored as a series of key-value pairs, which may be stored as part of the manifest file or in a separate file.

In some embodiments, the design element may be simultaneously visible in a local library client of a second application. Thus, the local library may receive new design elements as they are stored in the centrally stored library. This allows the design element to be immediately available in the second application. In some embodiments, the multiple representations of the design element may be visible as a single library item in the local library client of the second application. In some embodiments, for a design element type unsupported by the second application, the visibility of the design element may be obscured in the second application. In some embodiments, the second application may use a complementary representation of the design element type, where one of multiple representations is stored as the complementary representation of the design element type. In some embodiments, the multiple representations may include a primary representation, the primary representation corresponding to a representation with a highest level of detail, and at least one rendition representation, the at least one rendition representation corresponding to a complementary representation of the primary representation. For example, if the design element is a vector image file, the primary representation may be an AI representation, and at least one rendition representation may be a SVG representation. In some embodiments, the design element may only have one representation. The second application may use a complementary representation of the design element type, where the complementary representation is not stored in the centrally stored library. Thus, the library storage service may create the complementary representation of the design element type usable by the second application. Alternatively, the second application may receive the representation of the design element, and generate a complementary representation for use by the second application.

These configurations provide for easy storage and interchangeability of design elements between applications and devices. By providing easy storage and interchangeability of design elements, a user may freely use the design elements in different applications and on different devices with the assurance that the design elements will be compatible with the application. Furthermore, the design element can be in a format with a high level of detail without having to create the compatible version of the design element separately, allowing for effective management of design elements.

Figure 5:
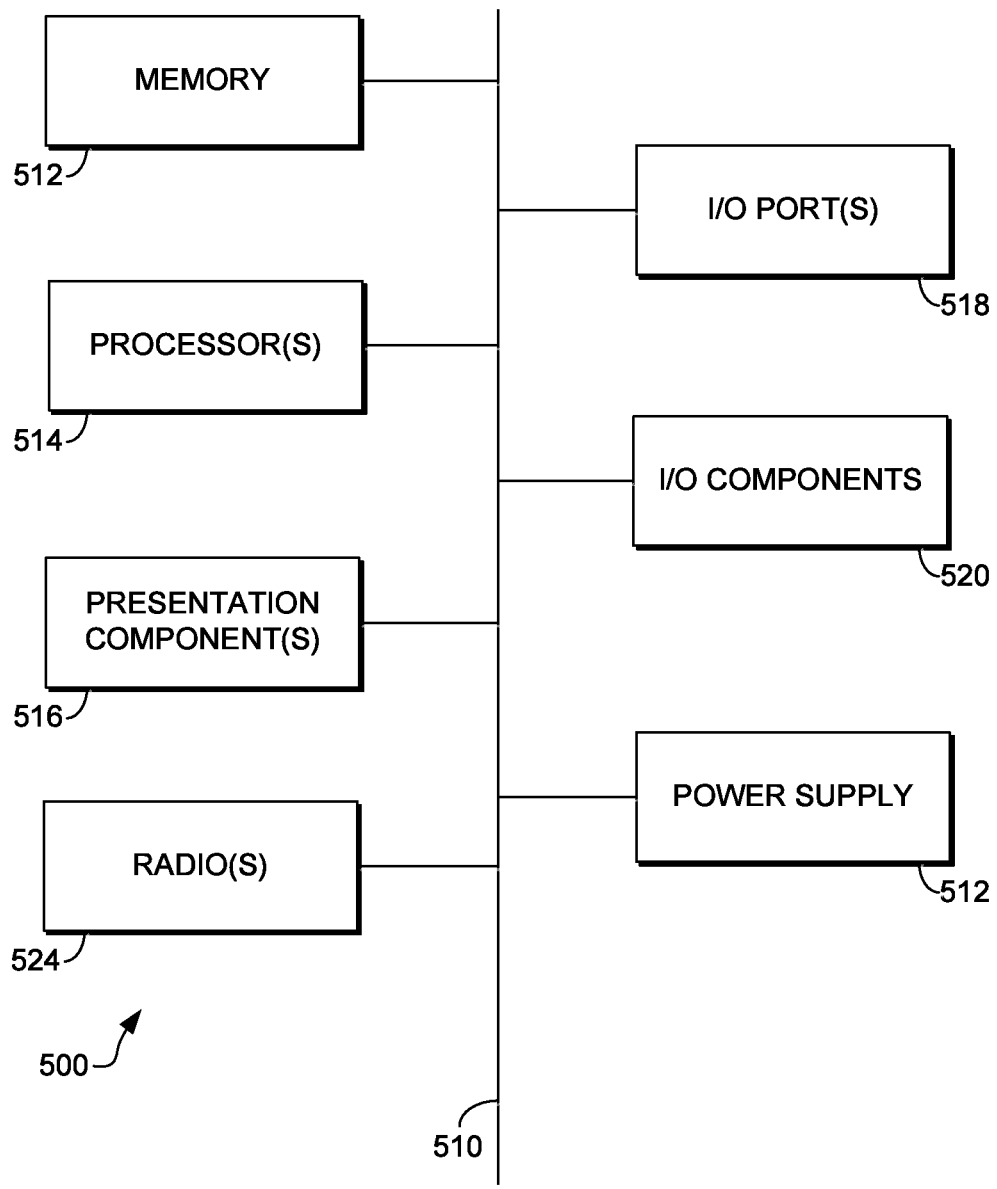
FIG. 5 is a block diagram illustrating an exemplary computing environment suitable for use in implementations of the present disclosure.

An exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component 520. Also, processors have memory. The inventors hereof recognize that such is the nature of the art, and reiterate that the diagram of FIG. 5 is merely illustrative of an exemplary computing device that can be used in connection with one or more aspects of the invention. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory 512 may be removable, nonremovable, or a combination thereof. Exemplary memory includes solid-state memory, hard drives, optical-disc drives, etc. Computing device 500 includes one or more processors 514 that read data from various entities such as bus 510, memory 512 or I/O components 520. Presentation component(s) 516 present data indications to a user or other device. Exemplary presentation components 516 include a display device, speaker, printing component, vibrating component, etc. I/O ports 518 allow computing device 500 to be logically coupled to other devices including I/O components 520, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the present invention.

A NUI processes air gestures, voice, or other physiological inputs generated by a user. Appropriate NUI inputs may be interpreted as ink strokes for presentation in association with the computing device 500. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

A computing device may include a radio. The radio transmits and receives radio communications. The computing device may be a wireless terminal adapted to received communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Accordingly, embodiments of the invention may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments where tasks are performed by remote-processing devices that are linked through a communications network. In a distributed computing environment, program modules may be located in both local and remote computer storage media including memory storage devices.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Aspects of the invention have been described to be illustrative rather than restrictive. It will be understood that certain features and subcombinations are of utility and may be employed without reference to other features and subcombinations. This is contemplated by and is within the scope of the claims.

What is claimed is:

1. A method for sharing design elements comprising:
receiving a design element from a first application, the design element representing a property or component embedded in a document;
determining a design element type for the design element;
generating, based on the design element type, multiple representations for the design element, each of the multiple representations corresponding to a storage format for the design element;
storing the design element as the multiple representations in a centrally stored library, the centrally stored library being shared among a plurality of applications;
receiving an indication to use the design element in a second application; and
providing at least one of the stored multiple representations based on a compatibility with the second application.

2. The method of claim 1, further comprising:
causing to be displayed, in a local library of the first application, the design element being stored in the centrally stored library;
syncing the centrally stored library between the plurality of applications; and
causing to be displayed, in a local library of the second application, the design element in the centrally stored library.

3. The method of claim 2, wherein the causing to be displayed, in a local library of the second application, the design element in the centrally stored library is configurable by a user.

4. The method of claim 2, further comprising:
when a third application is incompatible with the design element type, preventing from being used, in a local library of the third application, the design element in the centrally stored library.

5. The method of claim 1, wherein the design element type is a style; and the design element stores style information.

6. The method of claim 1, wherein the design element type is a file; and the generating comprises determining the multiple representations based on at least one of mime type, file extension, and file format of file correspond to the design element.

7. The method of claim 1, the returning one of the multiple representations retrieving the multiple representations corresponding to the design element;

determining an interoperability of each of the multiple representations with the second application;

returning one of the multiple representations, the one of the multiple representations being determined based on the interoperability.

8. The method of claim 1, the returning one of the multiple representations retrieving the multiple representations corresponding to the design causing to be displayed the multiple representations in a ranked order; and returning one of the multiple representations based on a user selection.

9. The method of claim 8, wherein the multiple representations are ordered based on a level of detail.

10. The method of claim 1, further comprising:

receiving another indication to change the design element from the first application; and replacing the multiple representations with new multiple representations corresponding to the changed design element.

11. A computer-implemented method for storing design elements comprising:

receiving a design element from a first application, the design element representing a property or component embedded in a document;

determining a primary representation for the design element, the primary representation being a representation with a highest level of detail; and storing the design element as multiple representations in a centrally stored library, the multiple representations corresponding to the primary representation and one or more variations of the primary representation; the design element being available in a local library of a second application.

12. The method of claim 11, wherein the multiple representations of the design element are available as a single library item in the local library of the second application.

13. The method of claim 11, wherein the storing the design element comprises:

storing the design element in a manifest file, wherein the manifest file references the multiple representations.

14. The method of claim 11, wherein the primary representation is a style, and the multiple representations comprise style information as key-value pairs.

15. The method of claim 11, wherein the second application uses a representation of the design element, the representation being stored as one of the multiple representations.

16. The method of claim 11, wherein the multiple representations comprise at least one rendition representation that is different from the primary representation.

17. A system comprising:

a processing device; and a non-transitory computer-readable medium communicatively coupled to the processing device, wherein the processing device is configured for executing instructions stored in the non-transitory computer-readable medium and thereby performing operations comprising:

inputting a design element of a document to a first local library of a first application component, the design element representing a property or component embedded in the document;

storing the design element as multiple representations to a centrally stored library component, each of the multiple representations corresponding to a storage format for the design element based on a design element type; and providing the design element in a selected representation from the multiple representations to a second local library of a second application component, the selected representation being compatible for use in a second application associated with the second application component.

18. The system of claim 17, wherein the operations further comprise:

synchronizing the first local library with the centrally stored library component.

19. The system of claim 18, wherein the synchronizing further comprises:

determining a new design element being input to the first local library; and sending the new design element to the centrally stored library component.

20. The system of claim 17, wherein the multiple representations comprise a primary representation and one or more other representations.

* * * * *

UNITED STATES PATENT AND TRADEMARK OFFICE
CERTIFICATE OF CORRECTION

PATENT NO. : 10,455,056 B2
APPLICATION NO. : 14/833006
DATED : October 22, 2019
INVENTOR(S) : Smith et al.

Page 1 of 1

It is certified that error appears in the above-identified patent and that said Letters Patent is hereby corrected as shown below:

On the Title Page

Item (73), Assignee, Line 1, delete "Abobe Inc.," and insert -- Adobe Inc., --, therefor.

In the Drawings

In sheet 4 of 5, FIG. 4, reference numeral 430, Line 2, delete "RESPRESENTATIONS" and insert -- REPRESENTATIONS --, therefor.

In sheet 4 of 5, FIG. 4, reference numeral 430, Line 3, delete "LIBARY" and insert -- LIBRARY --, therefor.

Signed and Sealed this
Second Day of June, 2020

Andrei Iancu
*Director of the United States Patent and Trademark Office*